Figure 1:
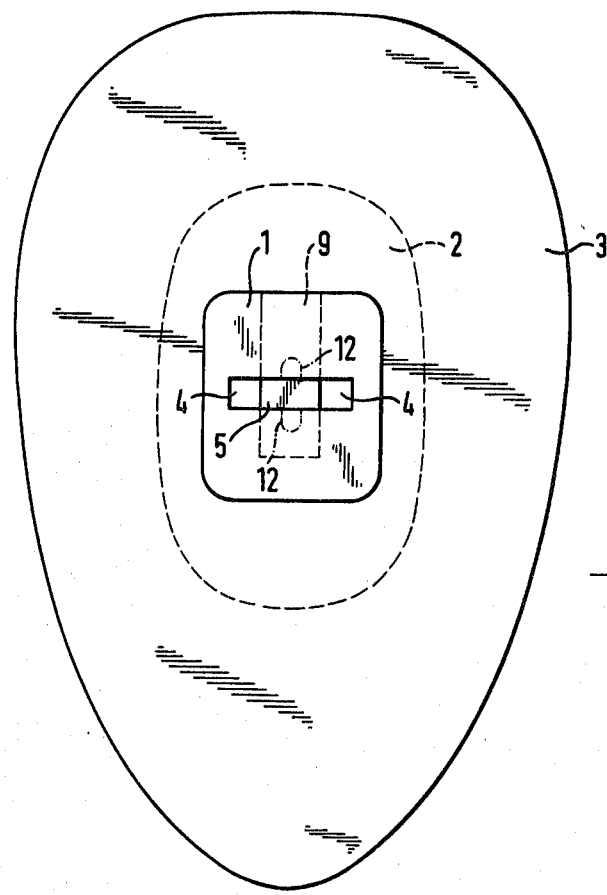

United States Patent [19]

Speer

[11] 4,420,227
[45] Dec. 13, 1983

[54] BRIDGE PAD ASSEMBLY FOR METAL SPECTACLE FRAMES

[76] Inventor: Herbert Speer, Dorfwiesenstrasse 92, D-7130 Muehlacker-Enzberg, Fed. Rep. of Germany

[21] Appl. No.: 325,492

[22] Filed: Nov. 27, 1981

[30] Foreign Application Priority Data

Nov. 27, 1980 [DE] Fed. Rep. of Germany ....... 3044615

[51] Int. Cl.$^3$ .......................... G02C 1/00; G02C 5/12
[52] U.S. Cl. ..................................... 351/138; 351/80; 351/88
[58] Field of Search .................. 351/80, 88, 138, 132; 2/445, 446

[56] References Cited

U.S. PATENT DOCUMENTS 4,040,729 8/1977 Winkler ................................ 351/138

Primary Examiner—John K. Corbin
Assistant Examiner—Rodney B. Bovernick
Attorney, Agent, or Firm—Balogh, Osann, Kramer, Dvorak, Genova & Traub

[57] ABSTRACT

A bridge pad assembly for a metal spectacle frame comprises a bridge pad, a bracket, a bridge pad holder comprising a connector, which is resiliently locked to said bracket, and a baseplate carried by said connector at one end there of and anchored in said bridge pad. The connector has a cavity which is closed at one end by said base and open at the other end, a cross-piece extending through said cavity and spaced from said base, and a transverse bore, which intersects said cavity between said base and said crosspiece and extends transversely to the latter. The bracket has a free end portion, which is fitted in said transverse bore and formed with lateral depressions on opposite sides. A U-shaped spring clip is fitted in said cavity and closes the latter at said other end and straddles said cross-piece and resiliently interlocks with said lateral depressions.

8 Claims, 3 Drawing Figures

BRIDGE PAD ASSEMBLY FOR METAL SPECTACLE FRAMES

This invention relates to a bridge and a assembly for metal spectacle frames, particularly to a bridge pad holder comprising a connector, which is provided with an anchoring baseplate and adapted to be resiliently locked to a bracket.

It is known to connect a connector, which is connected to the bridge pad, and a bracket carried by a metal spectacle frame by a screw-threaded joint or by a snap joint. For instance, connectors may resiliently snap into a frame of the bracket. Joints which are similar to snap fasteners are known too. For the first-mentiones joint, the small spring frame must be soldered to the bracket; this is complicated and difficult. In both designs, one or both sides of the joint must consist of spring material. Problems relating to the selection of material and external shape arise because these parts must be connected so as to be relatively movable.

It is an object of the invention to provide a snap joint which provides the required freedom of lateral movement and which can be manufactured efficiently from metal by gravity or pressure diecasting. A separately insertable and removable spring member should provide the releasable snap joint.

In a bridge pad holder for metal spectacle frames, comprising a connector, which is provided with an anchoring baseplate and adapted to be resiliently locked to a bracket, these objects are accomplished according to the invention in that the connector has a cavity which is closed at one end by said baseplate and open at the other end, a crosspiece extends through said cavity, a spring clip is provided and adapted to be fitted on said crosspiece so as to close the cavity at said other end, and the connector has a transverse bore, which intersects the cavity under the crosspiece and is adapted to receive an end portion of the bracket, which end portion has lateral recesses, which are adapted to resiliently interlock with the legs of the spring clip. With that design, the connector may be made by gravity or pressure diecasting and the bracket may be made from rod material without need for a soldering operation. The parts are resiliently locked by a separate spring clip.

Figure 2:
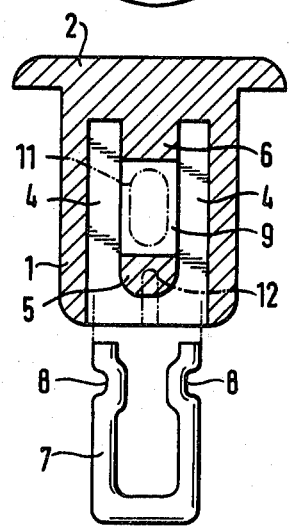
Figure 3:
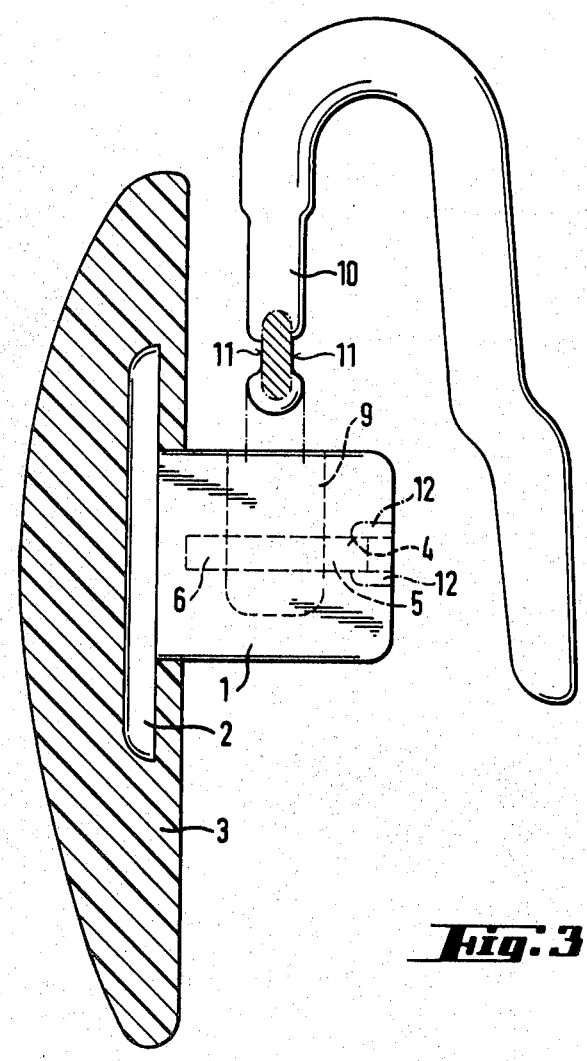

Further details of an illustrative embodiment of an assembly according to the invention will be described with reference to the accompanying drawings, in which FIG. 1 is a rear elevation showing a bridge pad and bridge pad holder, FIG. 2 is a transverse sectional view showing the holder of FIG. 1 and FIG. 3 is a side elevation showing the holder of FIGS. 1 and 2 as the end portion of the bracket is inserted, which bracket is shown in a position to which it has been turned through 90°.

It is apparent from the drawings that the bridge pad holder for metal spectacle frames comprises a connector 1, which carries a baseplate 2 that is anchored in the bridge pad 3. The connector 1 has a cavity 4, which is closed at one end by the baseplate 2 and is open at the other end and which has in cross-section the shape of an elongated rectangle. A crosspiece 5, which is spaced from the open end of the cavity 4, and another crosspiece 6, which is integral with the baseplate 2, extend through the cavity 4 so that the latter is U-shaped in longitudinal section. A U-shaped spring clip 7 has legs formed with inwardly directed bulges 8 and is adapted to straddle the crosspiece 5 so that the bulges snap into the space between the crosspieces 5 and 6.

The connector 1 has also a transverse bore 9, which intersects the cavity 4 between the crosspieces 5 and 6 transversely to the latter and is open on one side of the connector and closed on the other side. The transverse bore 9 is oval or circular in cross-section and serves to receive the end portion of the pad bracket 10. That end portion has the same cross-section as the transverse bore 9 and has lateral recesses 11, which are adapted to receive the bulges 8 of the spring clip 7 so as to form a snap joint. To eliminate said snap joint, the connector is formed at its top with recesses 12, which open into the cavity 4 on the sides thereof and throng which an implement for engaging the spring clip 7 from below may be inserted in order to lift the spring clip 7 out of the cavity 4. The openings 12 are shown in phantom in FIG. 1. It is apparent that the connector 1 and the baseplate 2 can be efficiently made in one piece by gravity or pressure diecasting and the bracket 10 may be pressed from rod or strip stock. Only the spring clip 7 which is to be inserted must be made from spring material. Hence, the components are made from materials which are suitable for their respective functions.

What is claimed is:

1. In a bridge pad assembly for a metal spectacle frame, comprising
   a bridge pad;
   a bracket;
   a bridge pad holder comprising a connector, which is resiliently locked to said bracket; and a baseplate carried by said connector at one end thereof and anchored in said pad,
   the improvement residing in that
   said connector has a cavity which is closed at one end by said baseplate and open at the other end, a crosspiece extending through said cavity and spaced from said baseplate, and a transverse bore, which intersects said cavity between said baseplate and said cross-piece and extends transversely to the latter,
   said bracket has a free end portion, which is fitted in said transverse bore and formed with lateral recesses on opposite sides, and
   a U-shaped spring clip is fitted in said cavity and closes the latter at said other end and straddles said crosspiece and resiliently interlocks with said lateral depressions.

2. The improvement set forth in claim 1, wherein,
   said cavity has in cross-section the shape of an elongated rectangle,
   said crosspiece is spaced from said other end of said cavity,
   said connector has another crosspiece on the inside surface of said baseplate,
   said cavity is U-shaped in longitudinal section, and
   said U-shaped spring clip is designed to fit said cavity and has legs formed with inwardly extending bulges extending between said two crosspieces and resilently interlocking with said lateral recesses.

3. The improvement set forth in claim 2, wherein
   said transverse bore is parallel to said crosspieces and extends between the same and is open at one end and closed at the other.

4. The improvement set forth in claim 1, wherein said transverse bore and said free end portion of said bracket are oval in cross-section.

5. The improvement set forth in claim 1, wherein said transverse bore and said free end portion of said bracket are circular in cross-section.

6. The improvement set forth in claim 1, wherein said U-shaped spring clip has legs formed with inwardly extending bulges resiliently interlocking with said recesses and said recesses cross said bulges.

7. The improvement set forth in claim 1, wherein said spring clip is flat in cross-section.

8. The improvement set forth in claim 1, wherein said connector is formed with openings adapted to receive an implement for extracting said spring clip.

* * * * *